United States Patent
Agrawal et al.

(10) Patent No.: US 10,382,290 B2
(45) Date of Patent: *Aug. 13, 2019

(54) SERVICE ANALYTICS

(71) Applicant: NetScout Systems, Inc, Westford, MA (US)

(72) Inventors: Amreesh Agrawal, Bangalore (IN); Gaurava Kumar, Bangalore (IN)

(73) Assignee: NetScout Systems, Inc, Westford, MA (US)

( * ) Notice: Subject to any disclaimer, the term of this patent is extended or adjusted under 35 U.S.C. 154(b) by 172 days.

This patent is subject to a terminal disclaimer.

(21) Appl. No.: 15/584,774

(22) Filed: May 2, 2017

(65) Prior Publication Data
US 2018/0324058 A1 Nov. 8, 2018

(51) Int. Cl.
*H04L 12/24* (2006.01)
*H04L 29/12* (2006.01)
*H04L 12/26* (2006.01)

(52) U.S. Cl.
CPC ...... *H04L 41/5025* (2013.01); *H04L 41/5009* (2013.01); *H04L 61/1511* (2013.01); *H04L 41/142* (2013.01); *H04L 43/045* (2013.01); *H04L 43/062* (2013.01); *H04L 43/0882* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0149869 | A1* | 7/2005 | Kehr | G06Q 10/06 715/700 |
| 2006/0089890 | A1* | 4/2006 | Campbell | G06Q 30/04 705/34 |
| 2010/0152962 | A1* | 6/2010 | Bennett | G07C 5/008 701/31.4 |
| 2011/0004085 | A1* | 1/2011 | Mensinger | A61B 5/0031 600/365 |
| 2014/0277684 | A1* | 9/2014 | Lamers | G05B 15/02 700/145 |
| 2017/0078922 | A1* | 3/2017 | Raleigh | H04W 28/10 |
| 2017/0250892 | A1* | 8/2017 | Cooper | G06F 21/44 |

* cited by examiner

*Primary Examiner* — El Hadji M Sall
(74) *Attorney, Agent, or Firm* — Locke Lord LLP; Scott D. Wofsy; Christopher J. Capelli

(57) ABSTRACT

An Adaptive Service Intelligence (ASI) data set related to a monitored service is received from a plurality of interfaces. Performance of a monitored service is analyzed within and outside of a context of the performed service using the acquired ASI data set. At least one of one or more relationship dependencies associated with a monitored service is determined. Performance of each of the at least one dependencies is analyzed using the acquired ASI data set. A report including one or more ASI data set values indicative of service performance degradation is generated based on the analysis.

20 Claims, 6 Drawing Sheets

FIG. 4

| Application | Server | Client Community | Total requests | Failures% | Timeouts% | AvgRT (ms) |
|---|---|---|---|---|---|---|
| ClearCase | 1.2.3.4 | BECDev | 20000 | 10 | 20 | 534 |

| Application | Server | Total requests | AppRT (ms) | Client Community | Total requests | Failures% | Timeouts% | AvgRT (ms) |
|---|---|---|---|---|---|---|---|---|
| ClearCase | 1.2.3.4 | 130,000 | 400 | BECDev | 20000 | 10 | 20 | 534 |
| | | | | SJCDev | 40000 | 12 | 18 | 451 |
| | | | | WestfordDev | 70000 | 14 | | 413 |

402, 404, 502, 504, 406, 408, 410, 412, 414 — 500
506, 508

| Application | Server | Total requests | AppRT (ms) | Client Community | Total requests | Failures% | Timeouts% | AvgRT (ms) |
|---|---|---|---|---|---|---|---|---|
| ClearCase | 1.2.3.4 | 130,000 | 400 | BECDev | 20000 | 10 | 20 | 534 |
| | | | | SJCDev | 40000 | 12 | 18 | 451 |
| | | | | WestfordDev | 70000 | 14 | | 413 |
| | | | | Dependant On | Total requests | Failures% | Timeouts% | AvgRT (ms) |
| | | | | Active Dir | 20000 | 5% | 18% | 321 |
| | | | | DNS | 20000 | 0% | 1% | 12 |

FIG. 6

SERVICE ANALYTICS

FIELD OF THE INVENTION

This specification is directed, in general, to systems and methods for p ring data analytics, and, more particularly, to performing service analytics.

BACKGROUND OF THE INVENTION

Communication networks have become commonplace in the modern business world—private internal servers to enterprise architectures that support cloud based solutions. Increasingly, these communication networks are becoming more complex as modern business continues to shift various services into the digital world (e.g., Voice-over-IP) while also demanding the same (or even better) overall performance.

Typically, in an effort to improve performance of network application services, certain metrics, such as network performance events, are continuously monitored by, for example, network infrastructure (e.g., servers, routers, switches, etc.) and/or independent network monitoring devices. However, due to an ever increasing network complexity, some performance issues can prove difficult to detect, identify and troubleshoot. For example, certain network events can be self-corrected by network nodes (e.g., data is re-routed) before a network operator is made aware of an underlying issue. Other network events may simply prove too difficult to parse due to the amount of collected data.

Accordingly, there remains a need for improved network service monitoring and particularly, for improved visualization techniques that efficiently identify and display network service analytics data to a user (e.g., a system administer, a network operator, and the like).

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, an Adaptive Service Intelligence (ASI) data set related to a monitored service is received from a plurality of interfaces. Performance of a monitored service is analyzed within and outside of a context of the performed service using the acquired ASI data set. At least one of one or more relationship dependencies associated with a monitored service is determined. Performance of each of the at least one dependencies is analyzed using the acquired ASI data set. A report including one or more ASI data set values indicative of service performance degradation is generated based on the analysis.

BRIEF DESCRIPTION OF THE DRAWINGS

The accompanying appendices and/or drawings illustrate various, non-limiting, examples, inventive aspects in accordance with the present disclosure:

FIG. 4 is a table illustrating a specific example of a report produced using analysis of a monitored service within a service context, according to an embodiment of the present invention;

FIG. 5 is a table illustrating a specific example of a report produced using analysis of the monitored service outside of the service context, according to an embodiment of the present invention; and FIG. 6 is a table illustrating a specific example of a report produced using analysis of relationship dependencies associated with the monitored service, according to an embodiment of the present invention.

DETAILED DESCRIPTION OF CERTAIN EMBODIMENTS

Figure 1A:
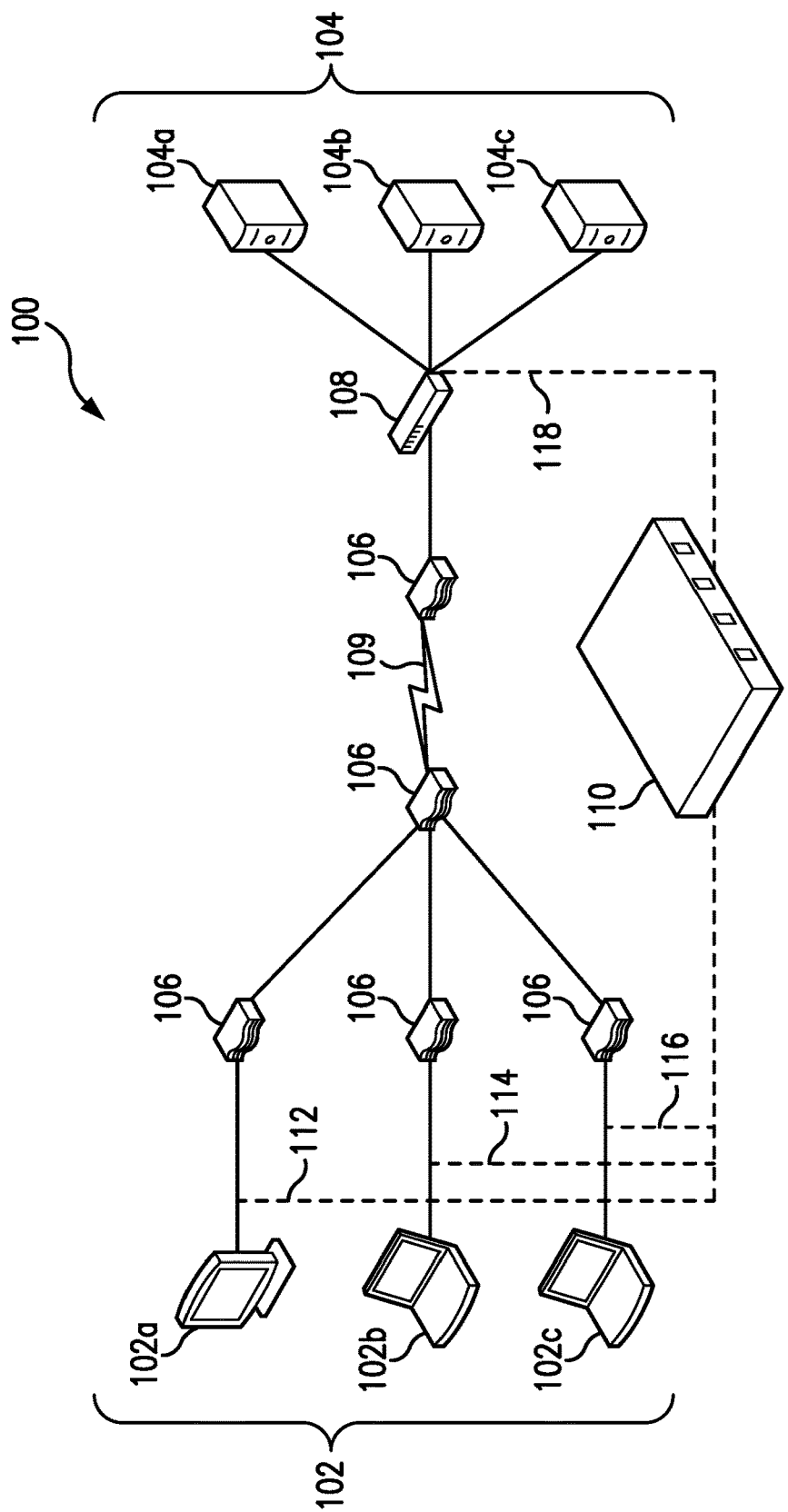
FIGS. 1A and 1B illustrate the architecture of a system for monitoring a service in a communications network, according to one embodiment of the present invention.

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

The present invention also relates to an apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. In addition, the present invention is not described with reference to any particular programming language. It will be appreciated that a variety of programming languages may be used to implement the embodiments of the present invention as described herein, and any references below to specific languages are provided for disclosure of enablement of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

In a communication network, traffic or data flows between nodes or network devices along one or more data paths (e.g., from a source node to a destination node including nodes there-between). As discussed above, isolating traffic or network data relating to network service performance issues for a conventional data path is difficult at best due to an inherent underlying network complexity (e.g., numerous paths, numerous nodes, numerous service enablers etc.). Embodiments of the present invention provide improved techniques for network monitoring to facilitate quicker and more accurate network service triaging. For example, these improved network monitoring techniques provide improved visual representations of relationship dependencies associated with a monitored service. Importantly, such visual representations, as discussed in greater detail below, include performance indicators outside of the service context, which may be influencing the service performance. To monitor service performance in a communication network a plurality of devices dedicated to monitoring data transmitted over the communication network are configured to monitor various metrics, such as certain Key Performance Indicators (KPIs), and provide data indicative of patterns of important KPIs over time. The plurality of devices summarizes a plurality of observed data packets into a compact Adaptive Session Intelligence (ASI) data set for storage and processing. The ASI data set provides the analysis granularity required to extract rich network, service- and user-related metrics on devices, subscribers, base station ID, Location Area (LA), Routing Area (RA), QoS, SITE, Access Point Name (APN), Tracking Area Code (TAC), and VLAN. Each record in the ASI data set may be updated in real-time. Depending on protocols, a network monitoring system extracts different sets of information, removes redundant information from the plurality of data packets, and focuses on the various types of performance problems affecting end users of numerous network applications.

Embodiments of the present disclosure give users freedom to decide which aspects to monitor for a service and which heterogeneous machine data to use for a particular KPI. In particular, one or more KPIs can be created for a service. Each KPI can be defined by a search query that produces a value derived from the machine data identified in the entity definitions specified in the service definition. Each value can be indicative of how a particular aspect of the service is performing at a point in time or during a period of time with respect to a particular threshold or a particular baseline. Embodiments of the present disclosure enable users to decide what value should be produced by the search query defining the KPI and if they need more detailed information. For example, a user may wish to expand dimensions of monitored service elements, such as, but not limited to, servers, client communities and locations. As another example, one or more users may wish to expand metrics (look at more KPIs) or may want to analyze patterns of important KPIs overtime.

However, the network monitoring system may retrieve and process multiple ASI data set records and may present either too much or too little of information for users to analyze. Making the best use of information is left to the user. For example, the user can change the display setting so that only one or two kinds of service related information are displayed. In other words, the provided data becomes only as good as the user using it. Furthermore, typical service performance analysis may be restricted to the information within service context and may result in incomprehensive reports, which may include, for example, performance time of various service components over time. However, such analysis might miss various factors outside of the service context, which may be influencing the service performance. Hence, various embodiments of the present invention provide a network monitoring system that can facilitate more efficient, uniform and effective analysis and troubleshooting of various service related events by providing visual information that addresses the above challenges.

Overview of System Architecture

Turning now descriptively to the drawings, in which similar reference characters denote similar elements throughout the several views, FIG. 1A depicts an exemplary communication network 100 in which bellow illustrated embodiments may be implemented.

It is to be understood a communication network 100 is a geographically distributed collection of nodes interconnected by communication links or interfaces and segments for transporting data between end nodes, such as smart phones, pads, personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC), and others.

The exemplary communication network 100 of FIG. 1 illustratively comprises client communities 102 (e.g., client computing devices 102a-102c) and a server farm 104 (e.g., servers 104a-104c) interconnected by various methods of communication (e.g., routers 106, switches 108 and the like). For instance, link 109 may be a wired link or may comprise a wireless communication medium, where certain nodes are in communication with other nodes, e.g., based on distance, signal strength, current operational status, location, etc. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

The term "community" as used herein refers to a dynamic and virtual association of client computing devices 102a-102c. The client community 102 can comprise as little as a few client computing devices or as many as thousands of client computing devices or more.

The client-server model of computer process interaction is widely known and used. According to the client-server model, a client process sends a message including a request to a server process, and the server process responds by providing a service. As used herein in the context of a client-server relationship, the term "server" refers generally to a computing device that provides information and/or services to other devices over a communication link (e.g., a network connection), and is not limited to any particular device configuration. Servers may include one or more suitable devices, such as dedicated server computing devices, or virtualized computing instances or application objects executing on a computing device. The term "client" can be used to refer to a computing device (e.g., a client device) that obtains information and/or accesses services provided by a server over a communication link, and is not limited to any particular device configuration. However, the designation of a particular device as a client device does not necessarily imply or require the presence of a server. At various times, a single device may act as a server, a client, a server and a client, or neither, depending on context and configuration. Actual physical locations of clients and servers are not necessarily important, but the locations can be described as "local" for a client and "remote" for a server to illustrate a common usage scenario in which a client is receiving information provided by a server at a remote location. A well-known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages. In the illustrated embodiment, the server farm 104 includes an active directory server 104a, CLEARCASE® server 104b and a domain name service (DNS) server 104c.

In one embodiment, the server computing devices 104a-104c are connected to a local area network (LAN) and a wide area network (WAN), such as the Internet. In such an embodiment, a network traffic management apparatus can perform a variety of functions including enforcing network security policies by facilitating authentication and authorization services. These services can be provided by one or more domain controllers or active directory servers 104a in communication with the network traffic management apparatus (not shown in FIG. 1).

The active directory servers 104a can be managed by the DNS server 104c that monitors the health of the active directory servers 104a and responds to requests from the network traffic management apparatus for the Internet Protocol (IP) address of an active directory server 104a that can provide the appropriate security services. In computer networking, DNS is a name resolution protocol for transmission control protocol (TCP)/IP networks, such as the Internet. Typically, a DNS server located in a data path resolves a DNS query, received from a client device (e.g., a host computing system 102a) in a network, by returning one or more IP addresses corresponding to a domain name associated with a remotely located computing resource, such as a remote CLEARCASE® server 104b. In other words, the DNS server 104c translates domain names into IP addresses and keeps information about location and the IP addresses of remotely located computing resources transparent to users. Information is ordinarily transmitted within the networks in packets and the term packet refers to a unit of data communicated within a network. A packet typically includes a packet source identifier and a packet destination identifier used to navigate the packet data through a network. The term packet may refer to a unit of data through a network. The term packet may refer to a unit of data communicated at any level of an open systems interconnection (OSI) model and between levels of the OSI model.

Source control management (SCM) products attempt to track and coordinate the work of multiple developers in creating new versions of a software product. Various SCM products, such as RATIONAL® CLEARCASE® by International Business Machines of Armonk, N.Y., are available to aid in basic source control management. The CLEARCASE® server 104b can work in conjunction with a software development methodology to create a record of activity related to the software product. The CLEARCASE® server 104b may also limit access to specific versions of the software to prevent multiple parties from simultaneously making changes to a given version of any file or directory element that comprises the software product.

According to an embodiment of the present invention, the communications network system 100 may further include one or more network monitors 110. The network monitors 110 are hardware, software, firmware or a combination thereof for monitoring network communication at various locations or links of the network 100. Each of the network monitors 110 may be deployed at certain locations or links of the network 100 to collect network data traversing the locations or links.

In one embodiment, the network monitor 110 monitors traffic flowing to and from the first client computing device 102a, second client computing device 102b and the third client computing device 102c via links 112, 114 and 116, respectively. Furthermore, the network monitor 110 is connected by link 118 to the server farm 104 interface. Network monitoring is an important operational scheme for network operators.

After collecting the network data packets, the network monitors 110 generate ASI data sets based on the received rich packet-flow data, and store the ASI data. The network monitor 110 may be a special purpose computing device or a software component (not limited to a single process) dedicated to monitoring data communicated via the network 100. Alternatively, the network monitor 110 may be a general purpose computing device with specialized software components installed thereon. In one embodiment, the network monitor 110 is embodied as nGenius Collectors, nGenius Probes or nGenius InfiniStream, available from NetScout Systems, Inc. of Westford, Mass.

Figure 1B:
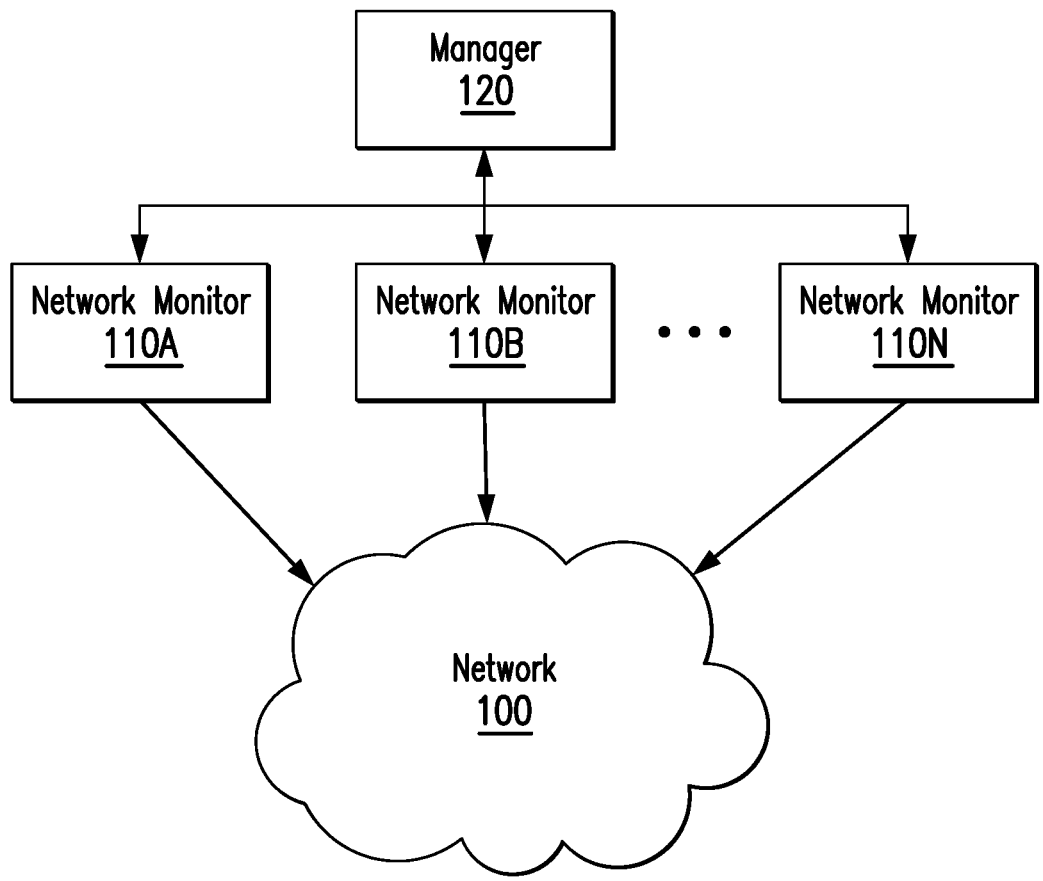

Referring now to FIG. 1B, the network monitoring system may further include a manager 120 connected to one or more network monitors 110A through 110N (hereinafter collectively referred to as "the network monitors 110"). The network monitors 110 are connected to the network 100 to monitor network data packets traversing at certain locations or links of the network 100 as described above in conjunction with FIG. 1A. The locations or the links connected to the network monitors 110 are preferably critical or important locations of the network 100.

The manager 120 is connected to the network monitors 110 to set various operating parameters. Although the manager 120 is illustrated as being directly connected to the network monitors 110, the manager 120 may communicate with the network monitors 110 via the network 100 or other networks. The network monitors 110 may be located remotely from the manager 120. Alternatively, the manager 120 may be co-located with one of the network monitors 110.

The operating parameters set by the manager 102 may include, among others, information stored in ASI records, the format of the ASI records, and lengths of time the ASI record should be stored. The information stored in the ASI may be set per protocol-by-protocol basis.

The manager 120 is hardware, software, firmware or a combination thereof for managing the operation of the network monitors 110. The manager 120 may perform one or more of the following functions: (i) process information based on ASI or selected network data packets received from the network monitors 110, (ii) receive parameters from a user for setting the operation of the network monitors 110, (iii) send commands to the network monitors 110 to set parameters or preferences for their operations, (iv) present the collected information to the user, (v) analyze performance of a monitored service, (vi) determine and analyze relationship dependencies associated with the monitored service, and (vii) provide actionable information about the monitored service.

The manager 120 may be embodied as a general purpose computing device installed with specialized software for performing one or more of these operations. Alternatively, the manger 120 is embodied as a specialized computing device. In one embodiment, the manager 120 is a computing device running nGenius ONE, available from NetScout Systems, Inc. of Westford, Mass. According to an embodiment of the present disclosure, the manager 120 may include a user interface (not shown in FIG. 1B) that enables a user to interact with the network monitoring devices 110, to operate the network monitoring devices 110, and to obtain data therefrom, whether at the location of installation or remotely. Alternatively, at least one of the client computing devices 102a-102c (shown in FIG. 1A) may include the user interface communicatively coupled to the manager 120.

Example Architecture of Manager

Figure 2:
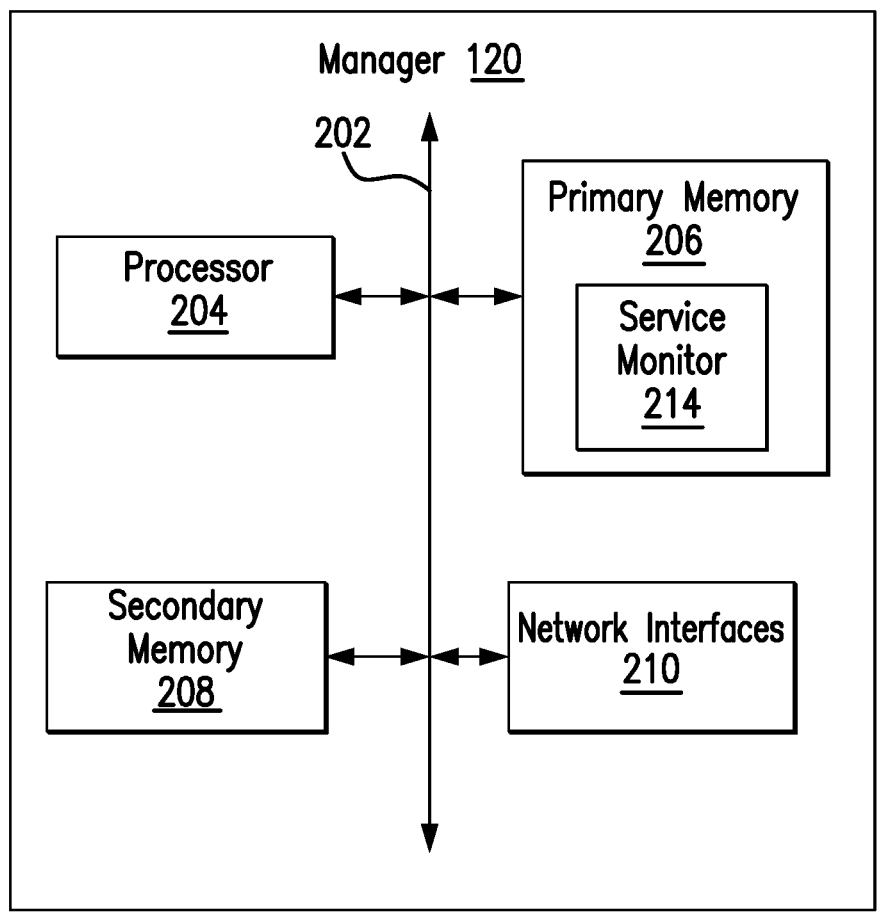
FIG. 2 is a block diagram of the manager of FIG. 1B, according to one embodiment of the present invention.

FIG. 2 is a block diagram of the manager 120, according to one embodiment of the present invention. The manager 120 may include, among other components, a processor 204, primary memory 206, secondary memory 208, and one or more network interface(s) 210. These components are connected and communicate via a bus 202. The manager 120 may also include other components not illustrated in FIG. 2, such as user input devices (e.g., keyboard and mouse) and display devices (e.g., a display driver card).

The processor 204 executes computer instructions stored in the primary memory 206 and/or the secondary memory 208. Although only a single processor is illustrated in FIG. 2, two or more processors may be used to increase the computing capacity and the processing speed of the manager 120.

The primary memory 206 is a computer readable storage medium that stores, among other data, computer instruction modules for processing, storing and retrieving network traffic data. The primary memory 206 may be implemented in various data storage devices (e.g., Random-Access Memory (RAM)) having a faster access speed compared to the secondary memory 208. The faster access speed of the primary memory 206 allows the manager 120 to analyze ASI data sets in real time.

The secondary memory 208 may be a secondary storage device for storing, among others, the processed KPIs and the processed ASI data sets. The secondary memory 208 may be embodied, for example, as a solid-state drive, hard disk or other memory devices capable of storing a large amount of data compared to the primary memory 206.

The network interfaces 210 may include a NIC (network interface card) or other standard network interfaces to receive ASI data sets. For example, the network interfaces 210 may be an Ethernet interface, a WiFi (IEEE 802.11) interface or other types of wired or wireless network interfaces. In one embodiment, two or more network interfaces are used to communicate with different types of networks or perform specialized functions.

In one embodiment, the network interface 210 sends the ASI data sets directly to a service monitor 214. The network interface 210 may send one data set of ASI data to the service monitor 214 for processing the real-time ASI data and another ASI data set for storing in the secondary memory 208 as historical data. Alternatively, the service monitor 214 may monitor service performance based on historical data stored by the secondary memory 208. That is, the service monitor 214 receives the ASI data sets from the network interface 210 (if analysis is done in real-time) or from the secondary memory 208 (if analysis is based on historical information), determines relationship dependencies associated with a monitored service, analyzes performance of each of the determined relationship dependencies and performance of the monitored service (both within and outside of the service context) using the acquired ASI data set, generates a report which includes one or more ASI data set values indicative of service performance degradation based on the analysis and sends the ASI data set values related to service performance degradation to the secondary memory 208. By receiving the ASI data directly from the network interface 210, the service monitor 214 operating in real time mode can process the ASI data at a high speed without delays associated with accessing the secondary memory 208.

Figure 3:
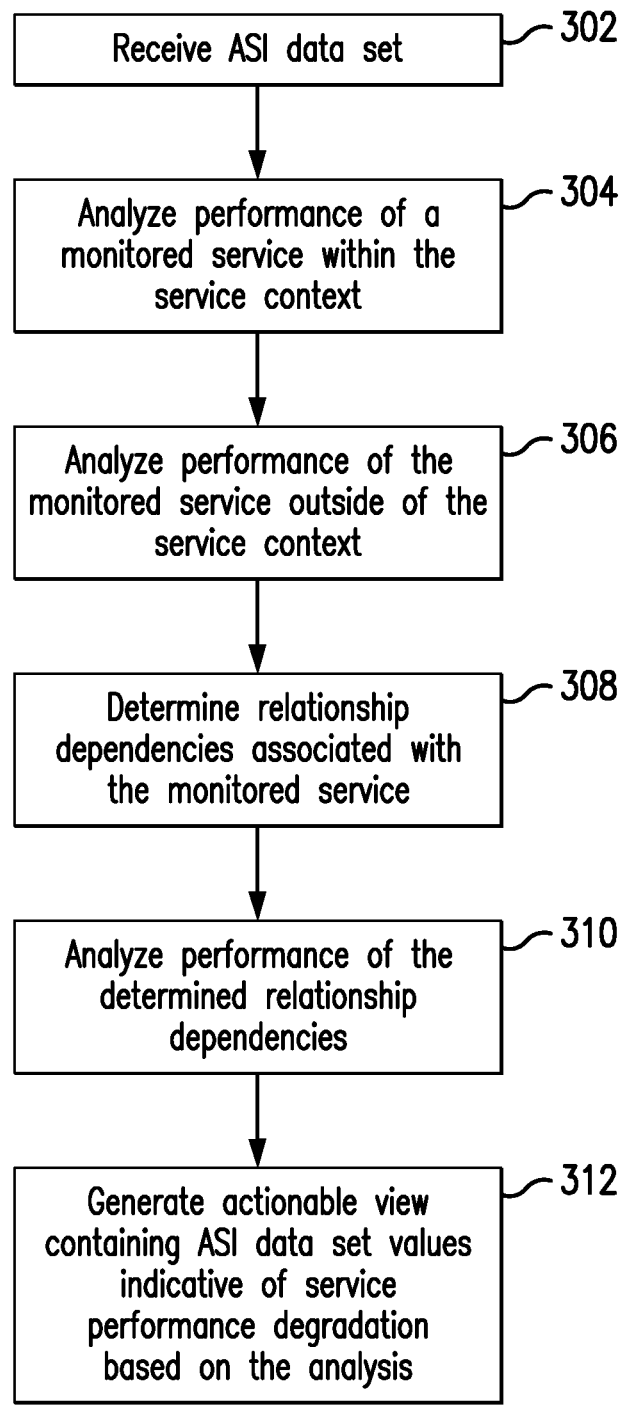
FIG. 3 is a flowchart illustrating a method for reporting service performance statistics in a communication network, in accordance with illustrative embodiments of the present invention.

FIG. 3 is a flowchart illustrating a method for reporting service performance statistics in a communication network, in accordance with illustrative embodiments of the present invention. Before turning to description of FIG. 3, it is noted that the flow diagrams shown therein is described, by way of example, with reference to components shown in FIGS. 1 and 2, although these operational steps may be carried out in any system and are not limited to the scenario shown in the aforementioned figures. Additionally, the flow diagram in FIG. 3 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

At step 302, the service monitor 214 receives ASI data from the network interface 210 or from the secondary memory 208. It should be noted that more than one network interface 210 can be used to receive ASI data. As noted above, the ASI data set provides performance metadata with analysis granularity required to extract rich network, service-related metrics on devices, subscribers, base station ID, VLAN, etc. A received data set may be labeled with a time period. In one embodiment, the received data set may correspond to a one hour time period. The ASI data set may include, among others, metrics of various types related to various services. Such metric ASI data may be sampled by the service monitor 214 at certain time intervals. These samples may be taken, for example, at five twelve minute intervals. Each data set may contain information about some metric, e.g. total number of requests or percentage of timeouts, at the sample time that the data set is captured.

At step 304, the service monitor 214 analyzes performance of a monitored service within a dynamically determined service context. Context is data about the environment in which a given service is provided, characteristics of a given service, qualities of a given service, or some combination of these. Examples of context include a software application associated with a service, a server hosting the application, a client community served by the service, the state of executing software or hardware being used by the service, as well as many other forms of environmental information. Continuing with the network environment shown in FIG. 1, in one non-limiting example, a monitored service may comprise a SCM service provided by the CLEARCASE® server 104b to the second client computing device 102b.

In one embodiment, step 304 may involve at least periodic monitoring of application server's health status. For instance, the service monitor 214 may determine whether the server has capacity to service all received requests. Server's capacity may be determined by evaluating the following exemplary metrics: TCP Zero Windows, a number of incurred TCP resets, and application response time. TCP Zero Window is a condition when a window size in a machine remains at zero for a specified amount of time. This means that a client is not able to receive further information at the moment, and the TCP transmission is halted until the client can process the information in its receive buffer. A TCP reset is a tool used by the TCP/IP stack in network devices to immediately close a connection. Typically, a TCP reset should indicate some type of error condition in the TCP stack. That could include the application actively closing a connection, or the server not being aware that a connection has been established. Application response time is calculated as the time it takes for a server to respond to a data request from a client with a non-zero payload packet.

Furthermore, if multiple application servers are configured to provide the monitored service, in step 304 the service monitor 214 may determine whether these application servers are receiving load balanced traffic. For example, the service monitor 214 may determine whether multiple application servers are individually serving same client communities, but only one server has disproportionally high number of requests as compared to others. The service monitor 214 may also check whether the application servers are serving the intended client communities and whether any clients from a client community access the analyzed server(s) when they should not be.

In yet another embodiment, step 304 may involve at least periodic monitoring of application associated with the monitored service. For instance, the service monitor 214 may determine if most application failures are related to a particular response message and if most application software failures are of a particular type(s) or produce particular error code(s).

FIG. 4 is a table illustrating a specific example of a report produced using analysis of a monitored service within the service context, according to an embodiment of the present invention. In this example, the generated report may include the following information: application 402 associated with the monitored service, IP address of the server 404 associated with the monitored service, client community 406 being served by the monitored service, total number of service requests 408 received by the monitored service from monitored client community, failure 410 and timeout percentages 412 associated with the monitored service and average round-trip transmission time 414 associated with the monitored service. It should be noted that users may have difficulty determining a source of a problem using exclusively service context information provided in the example report illustrated in FIG. 4. Looking at the service context information, it would seem that a low number of received requests will indicate that the CLEARCASE® server 104b need not be investigated any further and users might look elsewhere in the system for the source of the problem. However, certain monitored ASI metrics indicate some issues with the monitored service. For instance, evaluation of the collected KPIs in the ASI data set within the service context (shown in FIG. 4) may indicate there are too many timeouts 412 associated with the monitored service and the average round-trip transmission time 414 is relatively high. However, it is not clear from the presented data whether the network round-trip transmission time or the CLEARCASE® server 104b is a problem or if the source of the problem is elsewhere in the system.

Referring back to FIG. 3, according to an embodiment of the present invention, next, at step 306, the service monitor 214 expands the analysis and analyzes performance of the monitored service outside of the service context. In other words, the service monitor 214 automatically collects information outside of the context of a given service. For instance, the service monitor 214 may evaluate various client communities and the overall state of the network outside of the monitored service context.

More specifically, in one embodiment, the service monitor 214 may determine if identified issues can be narrowed down to specific to client communities. This analysis may further involve evaluation of client community (es) connectivity (e.g., whether all of the client communities are pointing to a right server). The service monitor 214 may also try to identify any client communities having processing environment issues (e.g., client specific software configuration issues, specific types of errors predominantly seen for a particular community). In addition, the service monitor 214 may identify top clients impacted within each evaluated client community.

In another embodiment, at step 306, the service monitor 214 may determine if there are any network issues associated with the network serving the monitored service. For instance, the service monitor 214 may compare at least some empirical measurements, such as comparing application's round trip transmission time with the TCP round trip transmission (RTT) rate to determine if the TCP RTT is a major contributor to overall average round trip transmission time. The service monitor 214 may also look for any evidence of the overall network being too loaded by examining certain network related functional KPIs. As non-limiting examples, high values of network utilization percentage and network retransmission metrics may be indicative of network overload. The service monitor 214 may also be configured to identify one or more segments within the network potentially associated with the performance degradation.

FIG. 5 is a table illustrating a specific example of a report produced using analysis of the monitored service outside of the service context, according to an embodiment of the present invention. In this case, the generated report in addition to information presented in FIG. 4 may include the following information outside of the service context: total number of service requests 502 received by the monitored service from all client communities and average round-trip transmission time 504 associated with the application 402. In one embodiment, this analysis may be performed by analyzing information obtained via link 118 connected to the server farm 104 interface. This service farm interface may be outside of the defined service context. It should be noted that the report 500 illustrated in FIG. 5 exposes a completely different view of monitored server's health. More specifically, the report clearly points out that even though CLEARCASE® server's 104*b* request contribution is relatively low, still the overall number of service requests 502 being processed by the application server 104*b* is quite significant and the average round-trip transmission time 504 associated with the application 402 is substantially high too (approximately 400 ms). In other words, the information presented in FIG. 5 indicates that either the CLEARCASE® server 104*b* received more requests than it can handle or indicates that this application server 104*b* is dependent on one or more service enablers which induce a delay. Thus, to perform even more comprehensive root cause analysis, further expanded breakdown of ASI metrics that would include relationship dependencies would be beneficial.

According to an embodiment of the present invention, at step 308, the service monitor 214 may determine relationship dependencies associated with the monitored service. In other words, the service monitor 214 determines what other services and/or network components are required for each monitored service to operate. For example, if a particular service is being monitored, the service monitor 214 may identify all data associated with the monitored service and the corresponding application, confirm if there is any data or object dependencies with other application(s) and take action to identify specific metrics that represent the determined relationship dependencies. The service monitor 214 can contain threshold criteria (e.g., time frame when data is considered no longer related) and can take action such as, but not limited to, archiving of identified specific metrics. The manner in which relationship dependencies are being determined by the service monitor 214 or being provided by another software solution are dependent on the purpose of the particular service being monitored.

According to an embodiment of the present invention, at step 310, the service monitor 214 may analyze performance of the determined relationship dependencies. In some embodiments, a monitored service may be dependent on another service/server which could provide, for example, directory lookup such as Lightweight Directory Access Protocol (LDAP), Active Directory (AD), single sign-on, Dynamic Host Configuration Protocol (DHCP) servers, DNS servers, and the like. In other embodiments, the monitored service may collect information from one or more of such servers and aggregate it. In some embodiments, the services on which the monitored service depends on are recreated in a compatible Platform as a Service (PaaS) in a public or private cloud. In some embodiments, the PaaS environment is instantiated by invocation of a programmatic interface of the cloud service provider.

In yet other embodiments, relationship dependencies may include data storage facilities. For example, storage facilities from the client communities 102 may be recreated using software-defined storage in a public or private cloud. Storage facilities may include an internet Small Computer Systems Interface (iSCSI), Fiber Channel (FC), or Network Attached Storage (NAS) storage. Storage in the cloud may include, for example, Amazon Simple Storage Service (S3), Amazon Web Services (AWS) Storage Gateway, or Amazon Elastic Block Store (EBS).

At step 312, the service monitor 214 may generate actionable view containing ASI data set values indicative of service performance degradation based on the analysis performed in steps 304-310, such as reports depicted in FIGS. 4 and 5 discussed above. FIG. 6 is a table illustrating a specific example of a report produced using analysis of relationship dependencies associated with the monitored service, according to an embodiment of the present invention. In this case, the generated report in addition to information presented in FIG. 5 may include the following information identified as relationship dependencies for monitored service: other services 602 required for the monitored service to operate, total number of service requests 604 received by the relationship dependencies 602, failure 606 and timeout 608 percentages associated with the relationship dependencies 602, as well as average round-trip transmission time 610 associated with the identified relationship dependencies 602. This expanded report provides critical information about the active directory 612 and DNS 614 services on which the monitored SCM service provided by the CLEARCASE® server 104*b* is dependent on. By looking at this expanded report, users can easily conclude with a substantial amount of accuracy that it is the active directory service 612 which affects greatly the incurred round trip latency 414 associated with the monitored service and that probably affects the incurred failures 410 associated with the monitored service as well. In other words, the service monitor 214 helps users to determine that the active directory service 612 in this case is the most likely cause of overall slowness of the monitored service.

Although active directory and DNS services have been described along with particular examples above, relationship dependencies analysis is not limited to the particular examples, nor to the categories of a monitored service analysis performed within the service context. Service context analysis includes any action taken in response to an occurrence of a data event that characterizes a given service or is indicative of a quality of a given service. Furthermore, any service analysis within the service context (step 304) can be performed substantially simultaneously as other data analyses (e.g., service analysis outside of the service context (step 306) and analysis of the determined relationship dependencies (step 310)) to draw various analytical conclusions related to the monitored service's performance. According to various embodiments of the present invention, the manager 120 is a modular application such that it can easily be repurposed or modified to solve new use cases for new types of monitored service.

Advantageously, the various embodiments described herein provide an analytical view which facilitates more efficient service monitoring and more accurate triaging of identified service issues. Certain discrete monitoring metrics are used to analyze monitored service's performance both within and outside of the service context. Non-limiting examples of such metrics may include specific KPI related to applications, servers, client communities and networks associated with the monitored service. In the aforementioned embodiments, to enable efficient and uniform monitoring and troubleshooting of various factors affecting service performance, one or more of monitoring devices monitor a subset of KPIs and generate the ASI dataset, which is sent to the manager from each monitoring device. The manager, in turn, generates an analytical view (report) based on the analyzed ASI information. The generated analytical view helps users with at least one of the following: narrows down the amount of information to analyze, highlights subclass of the ASI dataset by analyzing a plurality of service related scenarios. Furthermore, the presented analytical view enables users to acquire sufficient information by drilling down to individual factors or even individual relationship dependencies for selected monitored service(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reporting service performance statistics in a network, the method comprising steps of:
receiving, by a processor, an Adaptive Service Intelligence (ASI) data set related to a monitored service from a plurality of interfaces and sending a first copy of received ASI data to a device for analysis and a second copy of the received ASI data to a storage device;
analyzing performance of a monitored service within a context of the performed service using the acquired ASI data set;
analyzing performance of the monitored service outside of the context of a performed service using the received ASI data set;
determining at least one of one or more relationship dependencies associated with the monitored service;
analyzing performance of each of the at least one relationship dependencies using the acquired ASI data set; and
generating a report comprising one or more ASI data set values indicative of service performance degradation based on the analysis.

2. The method of claim 1, wherein the step of analyzing performance of the monitored service within the context of the performed service comprises analyzing one or more servers associated with the monitored service and analyzing an application program associated with the monitored service.

3. The method of claim 2, wherein the step of analyzing performance further comprises analyzing load-balancing of the one or more servers associated with the monitored service.

4. The method of claim 1, wherein the step of analyzing performance of the monitored service outside of the context of the performed service comprises analyzing one or more client communities associated with the monitored service and analyzing a network associated with the monitored service.

5. The method of claim 4, wherein analyzing performance further comprises analyzing configuration of each of the client communities associated with the monitored service.

6. The method of claim 2, wherein analyzing performance of the application program further comprises analyzing one or more detected error codes issued by the application program associated with the monitored service.

7. The method of claim 4, wherein analyzing performance further comprises identifying one or more segments within the network potentially associated with the performance degradation.

8. The method of claim 1, wherein the step of analyzing performance of each of the at least one relationship dependencies further comprises analyzing information about which network component the monitored service depends upon.

9. The method of claim 8, wherein the at least one dependency comprises one or more service enabler functions associated with the monitored service.

10. A network device for reporting service performance statistics in a network, the network device comprising:

a network interface configured to receive program instructions to receive an Adaptive Service Intelligence (ASI) data set related to a monitored service in the network from one or more network monitoring devices positioned at one or more locations in the network, and 1) send a first received ASI data set in real-time to a service monitoring engine and 2) send a second received ASI data set to a memory device; and a service monitoring engine configured to:
 analyze performance of the monitored service within a context of a performed service using the received ASI data set;
 analyze performance of the monitored service outside of the context of the performed service using the acquired ASI data set;
 determine at least one of one or more relationship dependencies associated with the monitored service;
 analyze performance of each of the at least one relationship dependencies using the acquired ASI data set; and
 generate a report comprising one or more ASI data set values indicative of service performance degradation based on the analysis.

11. The network device of claim 10, wherein the service monitoring engine configured to analyze performance of the monitored service within the context of the performed service is further configured to analyze one or more servers associated with the monitored service and analyze an application program associated with the monitored service.

12. The network device of claim 11, wherein the service monitoring engine configured to analyze performance is further configured to analyze load-balancing of the one or more servers associated with the monitored service.

13. The network device of claim 10, wherein the service monitoring engine configured to analyze performance of the monitored service outside of the context of the performed service is further configured to analyze one or more client communities and a network associated with the monitored service.

14. The network device of claim 13, wherein the service monitoring engine configured to analyze performance is further configured to analyze configuration of each of the client communities associated with the monitored service.

15. The network device of claim 11, wherein the service monitoring engine configured to analyze performance of the application program is further configured to analyze one or more detected error codes issued by the application program associated with the monitored service.

16. The network device of claim 13, wherein the service monitoring engine configured to analyze performance is further configured to identify one or more segments within the network potentially associated with the performance degradation.

17. The network device of claim 10, wherein the service monitoring engine configured to analyze performance of each of the at least one relationship dependencies is further configured to analyze information about which network component the monitored service depends upon.

18. The network device of claim 17, wherein the at least one relationship dependency comprises one or more service enabler functions associated with the monitored service.

19. A non-transitory computer readable storage medium structured to store instructions, the instructions when executed, cause a processor in a network device in a computer network to:
 receive an Adaptive Service Intelligence (ASI) data set related to a monitored service from a plurality of interfaces and send a first copy of received ASI data to a device for analysis and a second copy of the received ASI data to a storage device;
 analyze performance of the monitored service within a context of the performed service using the acquired ASI data set;
 analyze performance of the monitored service outside of the context of a performed service using the received ASI data set;
 determine at least one of one or more relationship dependencies associated with the monitored service;
 analyze performance of each of the at least one relationship dependencies using the acquired ASI data set; and
 generate a report comprising one or more ASI data set values indicative of service performance degradation based on the analysis.

20. The storage medium of claim 19, wherein the instructions that cause the processor to analyze performance of the monitored service within the context of the performed service further cause the processor to analyze one or more servers associated with the monitored service and analyze an application program associated with the monitored service.

* * * * *